(12) United States Patent
Turker et al.

(10) Patent No.: US 12,135,063 B2
(45) Date of Patent: Nov. 5, 2024

(54) LOCKABLE AXIS SLIM TYPE UNIVERSAL JOINT

(71) Applicant: ASELSAN ELEKTRONIK SANAYI VE TICARET ANONIM SIRKETI, Ankara (AR)

(72) Inventors: Caner Turker, Ankara (AR); Mete Anakli, Ankara (AR)

(73) Assignee: ASELSAN ELEKTRONIK SANAYI VE TICARET ANONIM SIRKETI, Ankara (TR)

(*) Notice: Subject to any disclaimer, the term of this patent is extended or adjusted under 35 U.S.C. 154(b) by 460 days.

(21) Appl. No.: 17/624,864

(22) PCT Filed: May 5, 2020

(86) PCT No.: PCT/TR2020/050374
§ 371 (c)(1),
(2) Date: Jan. 5, 2022

(87) PCT Pub. No.: WO2021/015692
PCT Pub. Date: Jan. 28, 2021

(65) Prior Publication Data
US 2022/0260119 A1    Aug. 18, 2022

(51) Int. Cl.
F16D 3/16      (2006.01)
F16D 3/36      (2006.01)

(52) U.S. Cl.
CPC .............. F16D 3/16 (2013.01); F16D 3/36 (2013.01); Y10T 403/32286 (2015.01); Y10T 403/32311 (2015.01)

(58) Field of Classification Search
CPC ...... F16D 3/16; F16D 3/36; Y10T 403/32286; Y10T 403/32311
USPC ...................................... 403/87, 90; 464/126
See application file for complete search history.

(56) References Cited

U.S. PATENT DOCUMENTS 2,136,035 A * 11/1938 Altemus ............... F41J 9/20
                                                        403/90
3,588,025 A *  6/1971 Gersman ............. G02B 7/1825
                                                        403/90
3,798,925 A     3/1974 Martus

FOREIGN PATENT DOCUMENTS

| CN | 101592194 A | 12/2009 |
| CN | 106499739 A | 3/2017 |
| CN | 206889512 U | 1/2018 |
| DE | 102004028013 A1 | 12/2005 |
| GB | 6349 * | 3/1916 ..................... 403/90 |

* cited by examiner

*Primary Examiner* — Greg Binda
(74) *Attorney, Agent, or Firm* — Bayramoglu Law Offices LLC

(57) ABSTRACT

A slim type universal joint is used to transmit torque generated by an output/driving shaft and/or rotary motion on a rotation axis on a system of engine vehicles connected thereto into the output/driving shaft of a different axis and allows independent locking of the rotation axis. The slim type universal joint includes a locking hole, a central-lower part, a central-upper part, pin holes, an outer-lower part and an outer-upper part, a first short cap pin, a second short cap pin and a long cap pin.

4 Claims, 8 Drawing Sheets ions. The application is similar to the present invention of a slim type universal joint of lockable axis in respect to the slim structure. However, it does not contain an embodiment related to a lockable axis.

LOCKABLE AXIS SLIM TYPE UNIVERSAL JOINT

CROSS REFERENCE TO THE RELATED APPLICATIONS

This application is the national phase entry of International Application No. PCT/TR2020/050374, filed on May 5, 2020, which is based upon and claims priority to Turkish Patent Application No. 2019/11107, filed on Jul. 24, 2019, the entire contents of which are incorporated herein by reference.

TECHNICAL FIELD

The invention relates to a lockable slim type universal joint on X and Y rotation axis independent of each.

The invention particularly relates to slim type universal joint used to transmit rotary motion in torque and/or on rotation axis generated by outlet/driving spindle on the system connected thereto into outlet/driving spindle on different axis and allowing independent locking of rotation axis.

BACKGROUND

Today, universal joints of various shapes according to their areas of use (universal joints) are located on two ends of a shaft depending on the motion transmission system of the vehicle used upon, and are used for providing a connection between an output shaft and a shaft, and also transmit a rotary motion on an X-Y rotating axis to an output shaft located on a different axis.

In current application, universal joints are lockable axially, and occupy little space because of their slim structure. However, the X-Y rotating axis of said joints are not lockable independent of each other. Not being capable of locking independently causes restriction of the rotary motion of each.

One current application discloses universal joints and shafts providing torque transmission wherein shafts having an angular gap between axis that are connected. In said application, an input shaft of a universal cap performs universal joint motion in universal a housing Pin moving inside a circular channel integrated to hole in a spherical hole of an input spindle and located inside a body that provides torque transmission. A spherical structure of the universal joint used in said application is similar to the present invention. However, the universal joint has a slimmer structure and it does not disclose less space occupation.

The application numbered DE102004028013A1 encountered when conducting search on the subject matter discloses a universal joint including a hollow bearing bush and supplementary extension parts on joint yoke functioning as a locking unit. The application discloses a universal joint having a first and a second yoke and a journal cross connecting the joint yokes with four bearing journals, each bearing journal being in a hollow cylindrical bearing bush when mounted and wherein each bearing bush is held by means of a securing device in a yoke. The application discloses a system conducting locking by means of an interlocking recesses and embossing noses. However, this locking system does not disclose a locking mechanism locking the X-Y rotary axis separately, and providing motion of their axis independent of each other.

Another document encountered when searching the related field is the application numbered CN206889512U, which discloses a new and three-dimension universal joint. The joint disclosed under the application is produced to eliminate the disadvantages of available two-shaft joints. Said application eliminates mechanical mounting difficulty. The application is similar to the present invention of a slim type universal joint of lockable axis in respect to the slim structure. However, it does not contain an embodiment related to a lockable axis.

As a result, due to the above described disadvantages and inadequacy of existing solutions, it is necessary to make developments in the related art.

SUMMARY

The invention has been developed with inspiration from the existing situation and aims to eliminate the above mentioned disadvantages.

The primary purpose of the invention is to transmit the torque generated by driving shaft (n) located on the system, and the rotary motion on the X-Y axis, to an output shaft located on a different axis.

Another purpose of the invention is to provide testing of products such as unmanned air vehicles at a desired axis by connecting the vehicle to test systems without preventing free motion of the vehicles and thus preventing the effects of tests conducted at such an axis thereon thanks to the independent interlockability of the rotary axis.

The structural and characteristic features of the invention and all advantages will be understood in better detail after reviewing descriptions of the Figures given below and with reference to the Figures, and therefore, an assessment should be made taking into account the Figures and detailed explanations.

DESCRIPTION OF PART REFERENCES

B. Universal joint
  12. Inner part
  13. Central ring
    2.1. Central-lower part
    2.2. Central-upper part
  14. Outer ring
    3.1. Outer-lower part
    3.2. Outer-upper part
  15. Short cap pin-4
  16. Short cap pin-5
  17. Pin-6
  18. Pin-7
  19. Pin-8
  20. Pin-9
  21. Pin-10
  22. Long cap pin-11
  h—Pin hole-a
  i—Pin hole-b
  j—Pin hole-c
  k—Pin hole-d
  l—Pin hole-e
  m—Pin hole-f
  n—Pin hole-g
  h1—Radial housing-1
  h2—Radial housing-2
  l—Alignment hole
  m—Locking hole
  n—Screw hole
  p—Alignment diameter
  q—Driving shaft
  r—Output shaft

DETAILED DESCRIPTION OF THE EMBODIMENTS

In this detailed description, the preferred embodiments of the lockable axis slim type universal joint being subject of the invention have been described only for purpose of better understanding of the matter.

Lockable axis slim type universal joint (A) of the invention basically includes three parts, namely, inner part (1), central ring (2) and outer ring (3).

Figure 3:
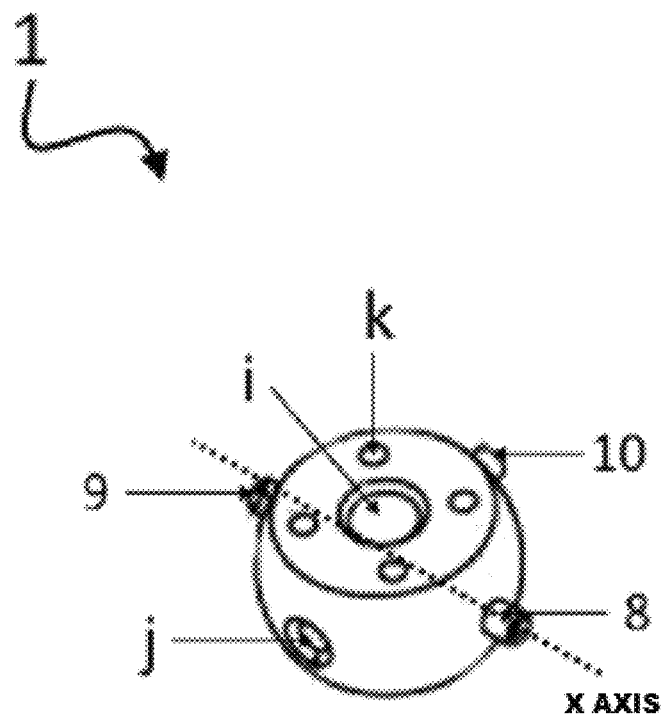
FIG. 3 is an illustrative perspective view of inner part of lockable axis slim type universal joint of the invention.

Outer surface of inner part (1) shown in details in FIG. 3 and forming the very inner structure is preferably spherical while lower and upper surfaces are preferably plane. Spherical inner part (1) includes
  at least a screw hole (k) used for connecting output/driving shaft (o, n) on upper surface,
  alignment hole (i) in centre to provide alignment of inner part (1) on X-Y axis,
  locking hole (j) on outer surface to provide locking of inner part (1) to X axis.

Said spherical inner part (1) on outer surface also includes
  pin-10 (10) located opposite locking hole-j (j) and providing alignment of inner part (1) to X axis and
  pin-8 (8) and pin-9 (9) located facing each other in a manner locking hole ( ) is between them and providing rotation of inner part (1) on X axis.

Figure 4:
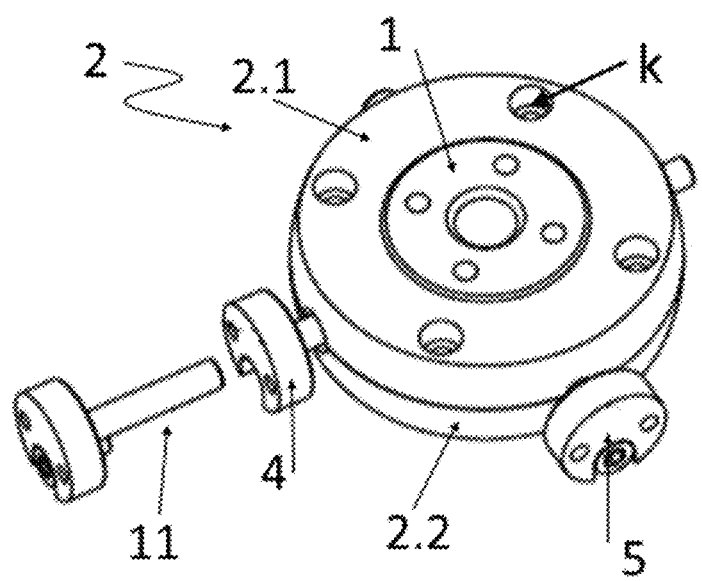
FIG. 4 is an illustrative perspective view of central ring of inner part of lockable axis slim type universal joint of the invention when mounted.

Central ring (2) demounted view given in FIG. 4 includes two separate sections, namely, central-lower part (2.1) and central-upper part (2.2) between which inner part (1) is located and mounted symmetrically to each other. Central-lower part (2.1) and central/upper part (2.2) are in ring form with central hollow. Inner and outer surfaces of central ring (2) are preferably spherical and lower and upper surfaces are preferably plane form. At least one screw hole (k) is formed between each pin hole (a, b, c, d) on outer surface of central ring (2) to connect output/driving (o, n) shaft and provide mounting of central-lower part (2.1) and central-upper part (2.2).

Pin holes of four on central lower part (2.1) and four on central-upper part (2.2) and facing each other, formed on inner surfaces of said central-lower part (2.1) and central-upper part (2.2) facing each other when central-lower part (2.1) and central-upper part (2.2) are mounted,)
  at least a pin hole-a (a) providing rotation of central ring (2) only on Y-axis,
  at least pin hole-b (b) located opposite pin hole-a (a), at least a pin hole-d (d) and at least a pin hole-c (c) located inside said pin-8 (8) and pin-9 (9) respectively and providing rotation of spherical inner part (1) on X axis and
radial housing-1 (h1) located in same alignment as pin hole-a (a) but a distance between them.

Figure 5A:
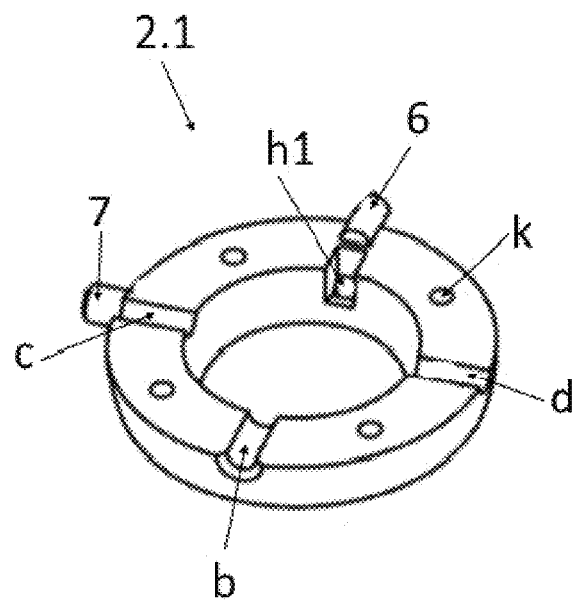
FIG. 5A and FIG. 5B are illustrative perspective views of demounted status of central ring of axis universal slim type lockable joint of the invention.
Figure 5B:
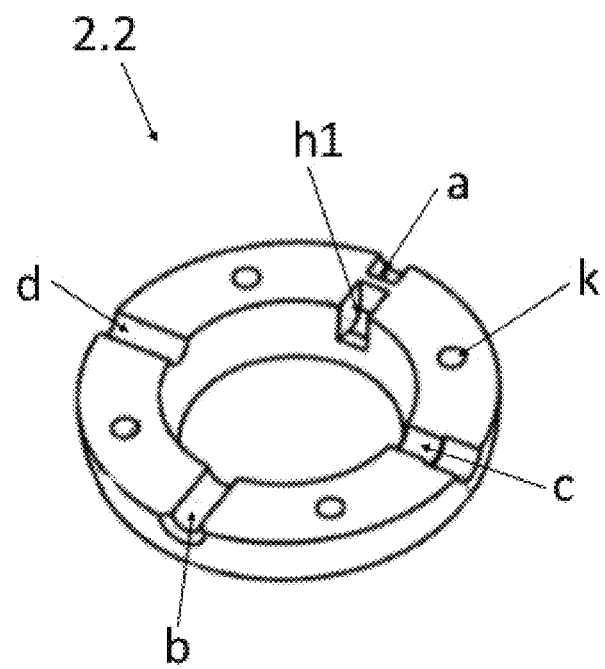

As seen in FIGS. 5A and 5B, central lower part (2.1) includes
  pin-6 (6) connected into pin hole-a (a) and providing rotation of central ring (2) only on Y axis,
  pin-7 (7) connected into pin hole-c (c) and providing alignment of central ring (2) to Y axis.

In a preferred embodiment of the invention, radial housing-1 (h1) and pin hole-a (a) are in same alignment but have a distance in between, pin hole-b (b) is exactly opposite to pin-a (a), pin hole-c (c) is exactly opposite to pin hole-a (a) and pin hole-b (b), pin hole-d (d) is exactly opposite pin hole-c (c) and formed at 90 degrees angle to each other.

Figure 6:
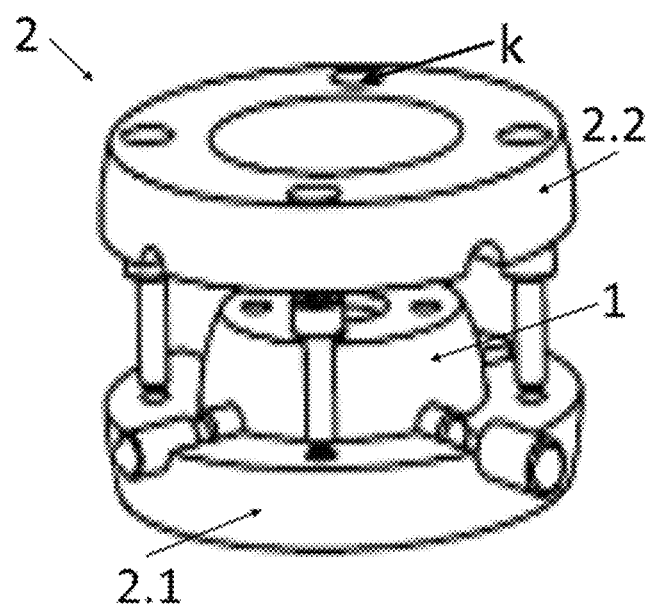
FIG. 6 is an illustrative perspective view of central ring of axis universal slim type lockable joint of the invention when mounting.

As shown in FIG. 6, spherical inner part (1) is located in the centre of central-lower part (2.1). Then central-upper part (2.2) is closed onto central-lower part (2.1) and mounted precisely. When conducting mounting operation,
  Said pin-10 (10) is located inside radial housing-1 (h1) and provides alignment of spherical inner part (1) to X axis and
  Said pin-8 (8) and pin-9 (9) are respectively located into pin hole-d (d) and pin hole-c (c) and provide rotation of spherical inner part (1) on X axis.

Figure 7A:
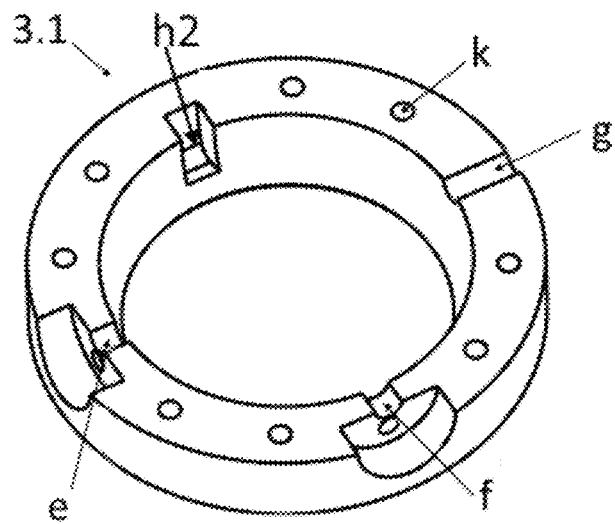
FIG. 7A and FIG. 7B are illustrative perspective views of demounted status of outer ring of axis universal slim type lockable joint of the invention.
Figure 7B:
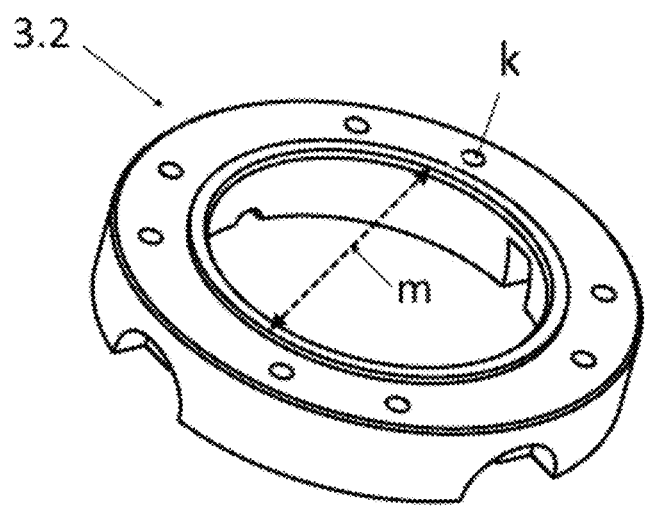
Figure 8:
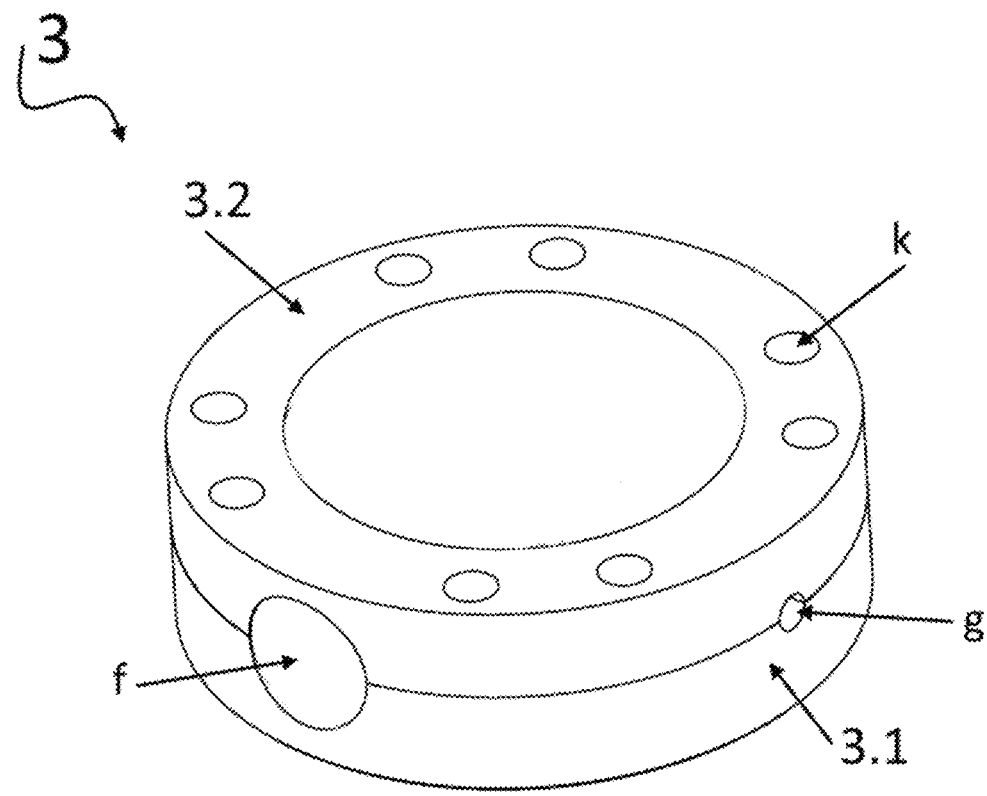
FIG. 8 is an illustrative perspective view of mounted status of outer ring of axis universal slim type lockable joint of the invention.
Figure 9:
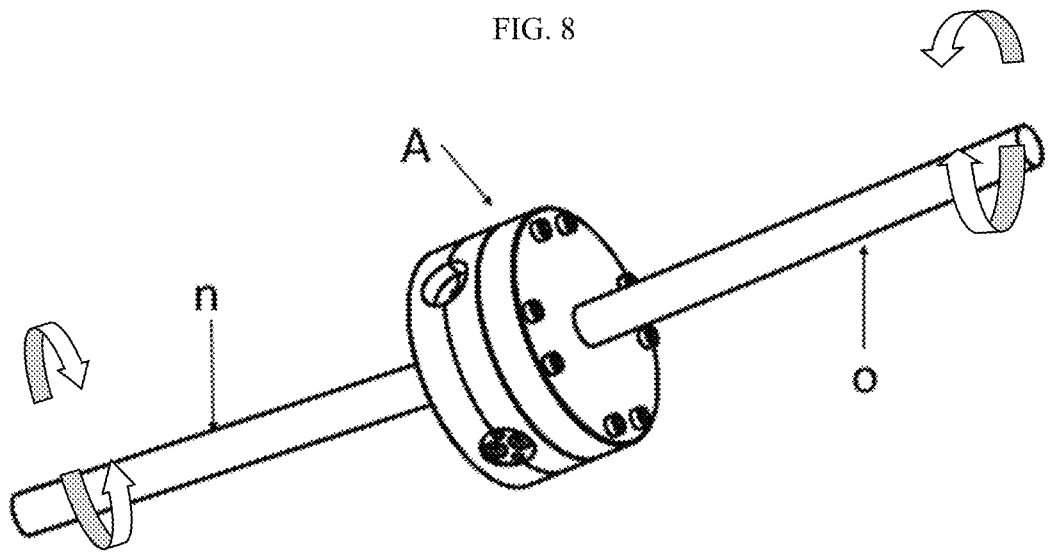
FIG. 9 is an illustrative perspective view of central ring of axis universal slim type lockable joint of the invention when connected to driving/output shaft.
Figure 10:
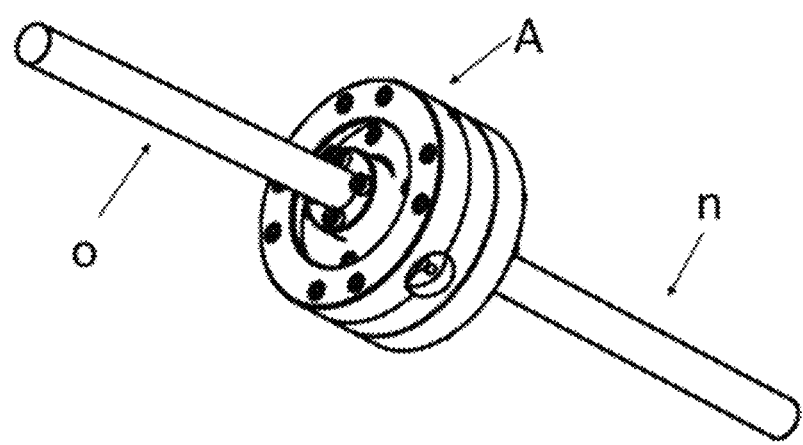
FIG. 10 is another illustrative perspective view of central ring of axis universal slim type lockable joint of the invention when connected to driving/output shaft.

As seen in FIG. 7A, FIG. 7B and FIG. 8, the outer ring (3) whereon all parts of universal joint (A) of the invention are located includes two separate symmetric parts namely outer-lower part (3.1) and outer-upper part (3.2) between which central ring (2) is placed and which are mounted symmetrically to each other.

Outer surface of outer ring (3) is in spherical form and at least one screw hole (k) is formed on upper surface to connect output/driving shaft. Also, alignment diameter (m) is added onto upper surface of outer ring (3). As shown in FIG. 7A and FIG. 7B, alignment diameter (m) is used to connect output/driving shaft (o, n) to universal joint (A) axially.

Said outré-lower part (3.1) and outer-upper part (3.2) include, formed on inner surfaces facing each other, facing each other when outer-lower part (3.1) and outer-upper part (3.2) are mounted,
  at least a pin hole-e ((e), at least a pin hole-g (g) located opposite pin hole-e,
  Pin hole-f (f) located in centre of said pin holes (e, g) and radial housing-2 (h2) located opposite pin hole-f (f).

Figure 1:
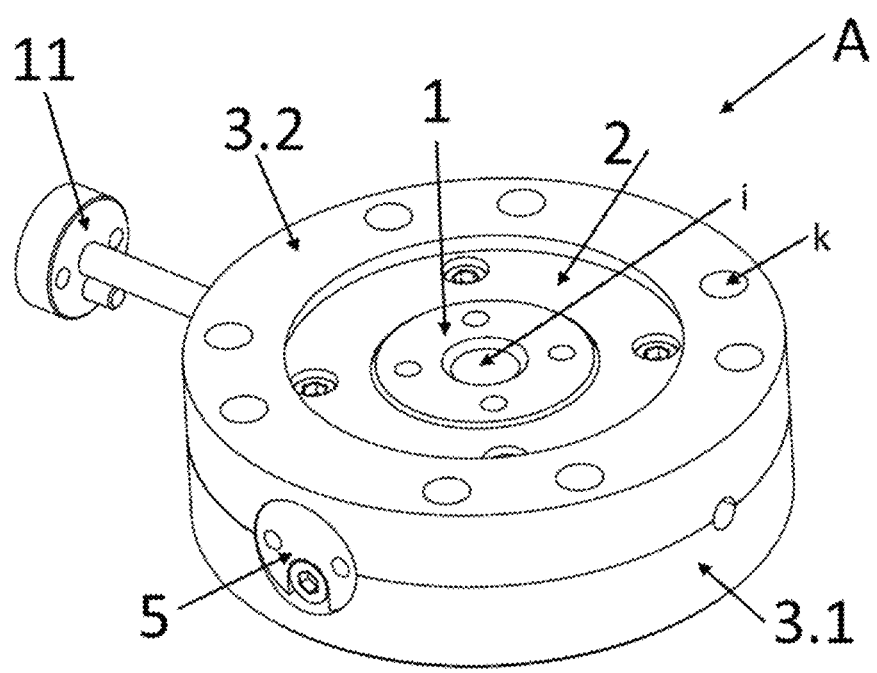
FIG. 1 is an illustrative general view of lockable axis slim type universal joint of the invention.
Figure 2:
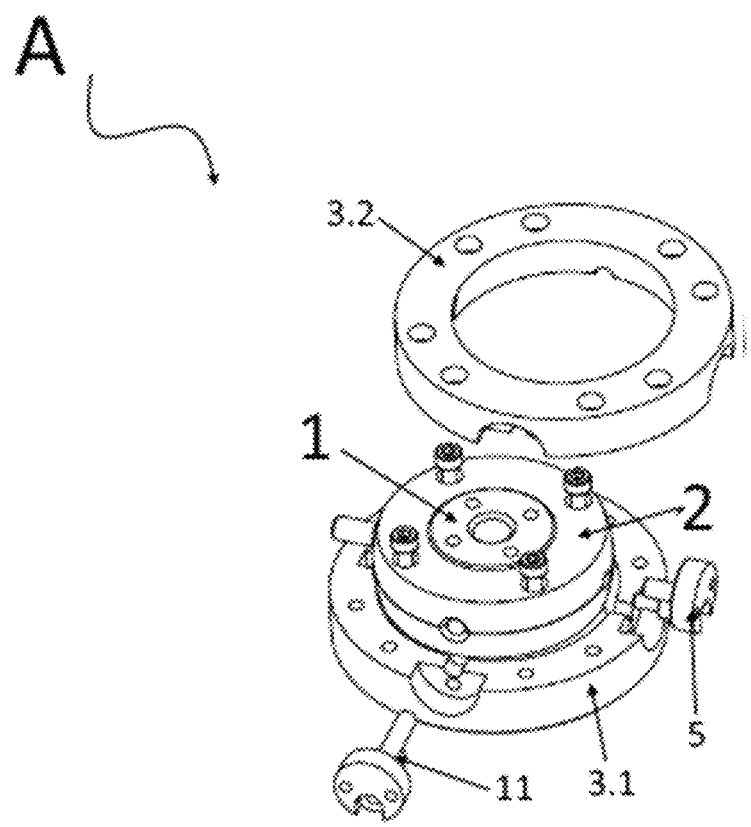
FIG. 2 is an illustrative perspective view of axis universal slim type lockable joint of the invention when mounting.

As shown in FIG. 2, central ring (2) is mounted onto outer-lower part (3.1) of outer ring (3). When conducting mounting operation, Said pin-7 (7) moves inside radial housing-2 (h2) and provides alignment of central ring (2) to only Y axis and Said pin-6 (6) is located in pin hole-g (g) and provides rotation of central ring (2) on only Y axis.

As shown in FIG. 4, universal joint (A) of the invention also includes short cap pin-4 (4) placed into pin hole-b (b) upon extending from pin hole-e (e) and thus providing rotation of central ring (2) on Y axis, short cap pin-5 (5) placed into pin hole-d (d) upon extending from pin hole-f (f) and thus providing locking of central ring (2) on Y axis, after passing said short cap pin-4 (4) from pin hole-b (b) and pin hole-e (e), long cap pin-11 (11) passed through pin hole-e (e) and placed into pin hole-b (b) and locking hole (j) and thus providing locking of spherical inner part (1) on X axis.

In a preferred embodiment of universal joint (A) disclosed under invention, inner part (1), central ring (2) and outer ring (3) are mounted in a manner Locking hole (j) on inner part (1) is in same alignment with pin hole-b (b) on central ring (2) and pin hole-e (e) on outer ring, Pin hole-c (c) on central ring (2) and radial housing-2 (h2) on outer ring (3) are in same alignment and Pine hole-a (a) on central ring (2)/radial housing-1 (h1) and pin hole-f (f) on outer ring (3) are in same alignment.

Working principle of universal joint (A) of the invention:

In order to provide locking and rotation of X-Y axis independent of each other;

short cap pin-5 (5) is passed through pin hole-f (f) and pin hole-d (d) in order to provide locking of central ring (2) on Y-axis, short cap pin-5 (5) is removed from its location and short cap pin-4 (4) is passed through pin hole-e (e) and pin hole-b (b) in order to provide rotation of central ring (2) on Y-axis, short cap pin-4 (4) is removed from pin hole-b (b) and pin hole-e (e) and long cap pin-11 (11) is placed instead in a manner to reach locking hole (j) too in order to provide locking of spherical inner part (1) on X-axis, pin-8 (8) and pin-9 (9) are respectively located into pin hole-c (d) and pin hole-c (c) in order to provide rotation of spherical inner part (1) on X axis.

With universal joint (A) of the invention, torque generated by driving shaft (n) provided in the system and rotary motion on X-Y axis are transmitted to output shaft (o) located on different axis. Said universal joint (A) can also be used for connection to testing system in tests of products such as unmanned air vehicles without preventing free motion and to conduct tests on desired axis thanks to lockable feature of axis during testing.

What is claimed is:

1. A universal joint used to transmit a torque generated by an output/driving shaft on a system where connected and/or a rotary motion in a rotary axis to the output/driving shaft on a different axis and allowing an independent lock of a rotation axis, comprising an inner part, a central ring, and an outer ring having at least one screw hole thereon to be used to connect the output/driving shaft on upper surfaces, an alignment diameter used to connect the output/driving shaft to the universal joint, an alignment hole to provide an alignment of a centre of the inner part on an X axis or a Y axis, comprising a locking hole to provide a locking of the inner part on the X axis and a third pin and a fourth pin located facing each other in a manner the locking hole is between the third pin and the fourth pin in order to provide a rotation of the inner part on the X axis on an outer surface of the inner part, a central-lower part and a central-upper part of the central ring wherein the inner part is located between the central-lower part and the central-upper part, and mounted symmetrically to each other, pin holes located on the central-lower part and on the central-upper part and facing each other, formed on an inner surface of the central-lower part and an inner surface of the central-upper part, and facing each other when the central-lower part and the central-upper part are mounted, wherein the pin holes comprises:

at least one first pin hole providing a rotation of the central ring only on the Y-axis, at least one second pin hole located opposite the at least one first pin hole, a fourth pin hole and a third pin hole located inside the third pin and the fourth pin respectively and providing a rotation of a spherical inner part on the X axis, a first pin connected into the at least one first pin hole and providing the rotation of the central ring only on the Y axis, an outer-lower part and an outer-upper part of the outer ring, wherein the central ring is placed between the outer-lower part and the outer-upper part and the outer-lower part and the outer-upper part are mounted symmetrically to each other, the outer-lower part and the outer-upper part comprise, formed on an inner surface of the outer-lower part and an inner surface of the outer-upper part facing each other, facing each other when the outer-lower part and the outer-upper part are mounted, at least one fifth pin hole, at least one seventh pin hole placed opposite the at least one fifth pin hole and providing the rotation of the central ring only on the Y axis upon a placement into the first pin, a sixth pin hole located in a centre of the at least one fifth pin hole and a centre of the at least one seventh pin hole a first short cap pin placed into the at least one second pin hole upon extending from the at least one fifth pin hole and thus providing the rotation of the central ring on the Y axis, a second short cap pin placed into the fourth pin hole upon extending from the sixth pin hole and thus providing a locking of the central ring on the Y axis, after passing the first short cap pin from the at least one second pin hole and the at least one fifth pin hole, a long cap pin passed through the at least one fifth pin hole and placed into the at least one second pin hole and the locking hole and thus providing a locking of the spherical inner part on the X axis.

2. The universal joint according to claim 1, comprising;

a first radial housing formed in a same alignment with the at least one first pin hole on the inner surface of the central-lower part and the inner surface of the central-upper part facing each other but having a distance in between, a fifth pin located opposite the locking hole on the outer surface of the inner part and moving inside the first radial housing and providing an alignment of the inner part on the X axis.

3. The universal joint according to claim 1, comprising;
a second radial housing formed in a manner to be opposite the sixth pin hole on the inner surface of the outer-lower part and the inner surface of the outer-upper part,
a second pin connected inside the third pin hole of the central-lower part and the central-upper part and moving inside the second radial housing and providing an alignment of the central ring on the Y axis.

4. The universal joint according to claim 1, wherein an inner surface and the outer surface of the inner part, an inner surface and an outer surface of the central ring, and an inner surface of the outer ring are in a spherical form.

\* \* \* \* \*